United States Patent [19]

Hawkins

[11] 4,396,213

[45] Aug. 2, 1983

[54] METHOD OF JOINING PIPE ENDS AND JOINT FORMED THEREBY

[75] Inventor: Hugh M. Hawkins, Annandale, Va.

[73] Assignees: John J. Kirlin, Rockville; Wayne T. Day, Wheaton, both of Md. ; part interest to each

[21] Appl. No.: 298,749

[22] Filed: Sep. 2, 1981

[51] Int. Cl.³ .................................................. F16L 13/08
[52] U.S. Cl. .............................. 285/287; 228/173 F; 228/382.1
[58] Field of Search ................. 285/287, 382.2, 382.1, 285/382; 228/136, 154, 173 F, 215

[56]  References Cited

U.S. PATENT DOCUMENTS

| | | | |
|---|---|---|---|
| 1,322,250 | 11/1919 | Lewis | 228/136 |
| 1,679,702 | 8/1928 | Wysong . | |
| 1,703,037 | 2/1929 | Heck . | |
| 1,890,998 | 12/1932 | Lindquist . | |
| 1,913,311 | 10/1933 | Young . | |
| 2,055,276 | 9/1936 | Brownsdon et al. . | |
| 2,084,207 | 6/1937 | Lindquist et al. | 285/287 X |
| 2,121,558 | 6/1938 | Coe et al. | 285/382.2 X |
| 2,192,914 | 3/1940 | Ice | 285/382.2 X |
| 2,504,625 | 4/1950 | Barnhart et al. | 285/287 |
| 3,008,737 | 11/1961 | Longfellow | 285/287 X |
| 3,198,556 | 8/1965 | Kruse et al. . | |
| 3,339,008 | 8/1967 | MacArthur et al. . | |
| 3,667,109 | 6/1972 | Alcenius . | |
| 3,750,248 | 8/1973 | Morris . | |
| 3,750,266 | 8/1973 | Hikido et al. . | |
| 3,822,464 | 7/1974 | Hester et al. | 285/382.2 X |

FOREIGN PATENT DOCUMENTS 1047125  7/1953  France ............................ 285/382.2

*Primary Examiner*—Thomas F. Callaghan
*Attorney, Agent, or Firm*—Larson and Taylor

[57]  ABSTRACT

A soldered pipe joint and a method for making same, wherein the flow of solder from one end of the overlapped pipe ends is terminated at a set of axially aligned circumferential grooves formed in the two pipe ends.

12 Claims, 8 Drawing Figures

METHOD OF JOINING PIPE ENDS AND JOINT FORMED THEREBY

FIELD OF THE INVENTION

This invention relates to a method of soldering pipes together, and to the joint formed thereby, and it relates in particular to a method of soldering metallic joints together, and to such a joint.

BACKGROUND OF THE INVENTION

In the field of soldering pipe ends together, one end of a pipe is inserted into the open end of another, larger pipe—in practice the "larger" pipe end is usually a "fitting" connected at its other end to another pipe end. After the pipe end is positioned within the larger pipe end, i.e. the fitting, the overlapped ends are heated and a soldering material is applied to the exposed end of the overlapped portion. Because of capillary action and the heat, the soldering material flows axially between the pipe ends from the first axial end of the overlap all the way to the other end of the overlap. This complete flow from one end of the overlapped portion to the other end thereof is generally referred to as 100% flow, and is generally the most desirable condition since it provides a joint of maximum strength.

However, under certain conditions, such 100% flow is undesirable. As one example, in certain manufacturing processes such as the manufacture of electronic components, it is necessary to supply a gas such as a nitrogen gas in a form as pure as possible. In such an environment, if the solder composition (or the flux material which is applied to the joint in advance of the soldering material and generally moves through the space ahead of the soldering material) reaches the end of the overlapped portion and protrudes into the interior of the conduit, it provides a source of impurities which can be carried away with the gas and adversely affect that manufacturing process. Under these conditions, it is desirable if not mandatory to limit the solder flow to less than 100%, for example between 25% and 75% for example, 50%.

The desire to limit solder flow to less than 100% of the overlapped portion has been recognized on occasion heretofore. For example, the Lindquist U.S. Pat. No. 1,890,998 recognizes the problem and provides one attempted solution therefor. However, the problem is a most difficult one to solve and to applicant's knowledge has not been solved heretofore as satisfactorily as with the present invention.

The difficulty is that once the pipe ends are heated to the proper temperature, which for a silver soldering composition would be approximately 1100° F., the force of the capillary action carrying the soldering material through the space between the pipes is a very great force and difficult to stop. Attempts to limit this flow by controlling and varying the temperature along the overlapped portion, i.e. 1100° F. for a first portion and a cooler temperature for the latter portion of the overlap, have also met with failure because of the extreme difficulty in attempting to provide an abrupt change in temperature in a heat conductive material such as the metal of the pipes. Indeed, in process piping the material is often copper which is of course is extremely conductive, thereby rendering solder control by temperature control very difficult if not impossible.

The applicant also attempted to limit solder flow by mechanically forcing the two pipes together along a circumferential band at the axial location where it was desired to stop the solder flow. (This attempt is essentially analogous to the attempt in the Lindquist U.S. Pat. No. 1,890,998 of utilizing a tapered end on the outer pipe.) However, this attempt also failed. No matter how great the force urging the inner and outer pipes together, there will always remain a "space" of a few thousands of an inch through which silver solder will flow under the high temperature conditions mentioned above. If on the other hand the force urging the two pipes together is extremely large, it will in all likelihood distort one of the pipes relative to the other, thereby creating at some point around the circumference of the overlapped pipes an opening through which the solder can flow to the end of the overlap and into the conduit.

Hence, there exists a need for a method of soldering pipe ends together, and to such a joint, wherein the flow of solder can reliably be stopped at a predetermined axial location less than the full axial length of the overlap.

SUMMARY OF THE INVENTION

It is therefore a purpose of the present invention to provide a new and improved method for joining pipe ends together, and to a pipe joint formed thereby, which solves the problems which existed heretofore.

This purpose is achieved in accordance with the method and pipe joint of the present invention by providing a method and arrangement whereby both the larger, outer pipe end and the smaller, inner pipe end are formed with a recessed circumferential groove, both grooves extending radially in the same direction, and both grooves being essentially axially aligned with each other, and wherein with the pipe ends and their grooves, thus arranged, the soldering material is introduced at the outside, i.e. exposed end of the overlapped portion. It has been found that with the pipes heated to the appropriate temperature for flow of the solder material being used, the solder will flow axially along the space between the pipes up to but not beyond the location of the aligned grooves.

In a preferred method for carrying out the present invention, the inner pipe end is formed with a groove. It has been found most convenient to form this groove with a conventional pipe cutting tool wherein the cutting elements are removed and placed by grooving wheels which are similar to the cutting wheels but which of course have a slightly wider cross section at the point where they engage the pipe. In one preferred arrangement used with 3" diameter copper piping, the grooving wheels formed a groove of approximately 1/16" in width and approximately 1/32" in depth.

The inner pipe with the groove thus formed is then placed into the larger, outer pipe, i.e. the "fitting" by an axial amount which is carefully noted. With the pipes thus overlapped, a groove is then formed on the outer pipe at a location which precisely matches the axial location of the groove on the inner pipe so that the inner side of the groove on the outer pipe will be aligned with and in fact most likely enter the groove formed on the inner pipe.

With the pipe ends and the grooves thus formed and arranged, the operator can apply heat to the appropriate temperature all along the overlapped portion without attempting to create any temperature variation therealong. With the pipe ends thus heated the solder is applied and will flow along the space between the pipes up to but not beyond the aligned grooves.

Hence, there is provided a new and improved pipe joint according to the present invention having aligned grooves and solder extending from one end of the overlap up to the grooves but not therebeyond.

Hence, it is an object of this invention to provide a new and improved method for soldering overlapped pipe ends together wherein it is necessary to limit the solder flow to less than the full length of the overlap.

It is another object of the present invention to provide a new and improved method for soldering together pipe ends under conditions wherein impurities within the conduit are to be avoided.

It is another object of this invention to provide a new and improved method for soldering pipe ends together wherein the axial extent of the solder flow can be limited without resorting to varying the temperature of the overlapped pipe ends along the length of the overlap.

It is still another object of this invention to provide a new and improved method for soldering pipe ends together wherein a pair of aligned grooves are provided, one on each of the pipe ends, said grooves being operable to limit the flow of solder.

It is another object of this invention to provide a new and improved pipe joint wherein the solder is located from one end of the overlap up to a predetermined axial point less than the full length of the overlap.

It is still another object of this invention to provide a pipe joint having aligned grooves and a solder connection from one end of the overlap up to the aligned grooves and not therebeyond.

It is still another of this invention to provide a conduit for carrying extremely pure gases, the conduit having pipe joints wherein the solder is not exposed to the interior of the conduit.

These and other objects of the present invention will become apparent from the detailed description to follow.

BRIEF DESCRIPTION OF THE DRAWINGS

There follows a detailed description of preferred embodiments of the invention to be read together with the accompanying drawings wherein.

DETAILED DESCRIPTION OF THE PREFERRED EMBODIMENTS

Figure 1:
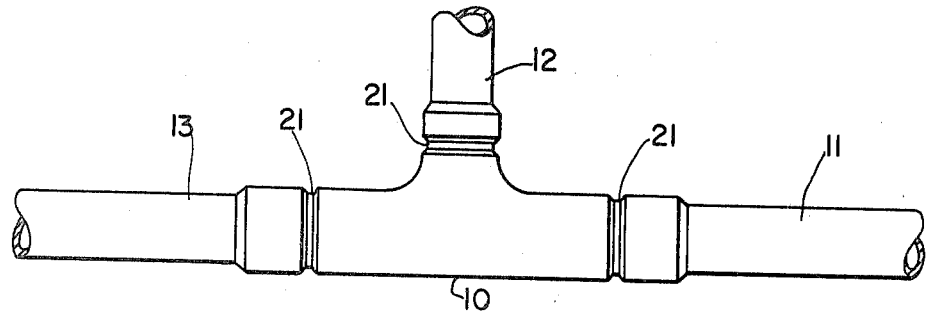
FIG. 1 illustrates a portion of a conduit having a fitting connected to three different pipe ends, each of the three connections being made in accordance with the present invention.

Referring now to the drawings, like elements are represented by like numerals throughout the several views.

FIG. 1 illustrates a typical "T" fitting joining together three pipes 11, 12 and 13. Of course fittings in a conduit system can take all different shapes, many including only two aligned openings, others providing four openings, etc. In FIG. 1 grooves 21 are shown in this fitting. However, the fitting 10 would have been manufactured without such grooves, the grooves being added while connecting together the fitting 10 and the respective pipes while carrying out the method of the present invention.

The method of the present invention will now be described especially with respect to FIGS. 2 through 6.

Figure 2:
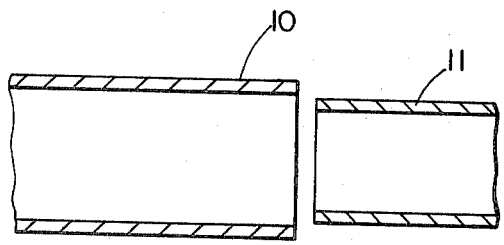
FIGS. 2 through 6 illustrate in central cross section one of the connections of FIG. 1, namely the one on the right hand side, in five successive steps in the formation of this pipe joint.
Figure 3:
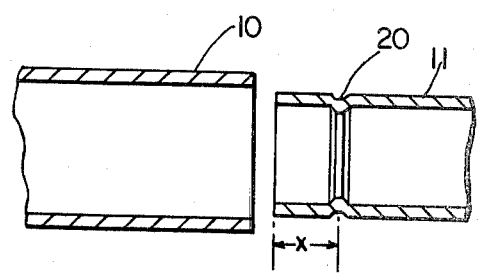
Figure 4:
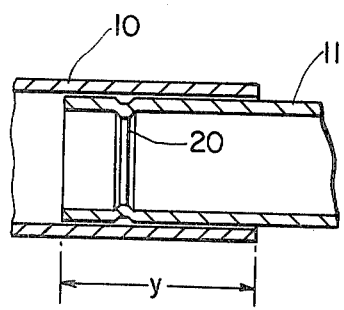
Figure 5:
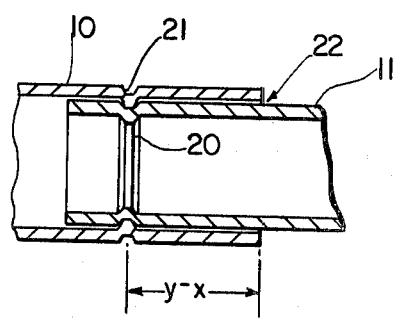
Figure 6:
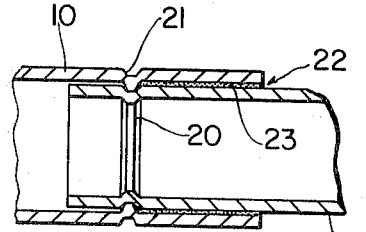
Figure 7:
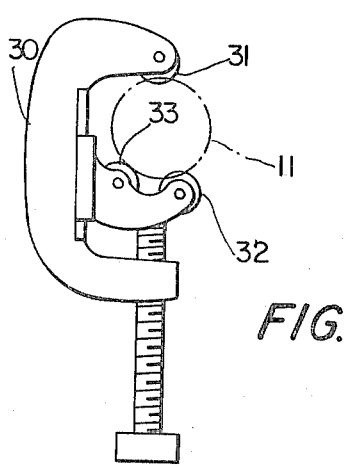
FIG. 7 is a side elevational view of a tool used for forming a groove in a pipe end.
Figure 8:
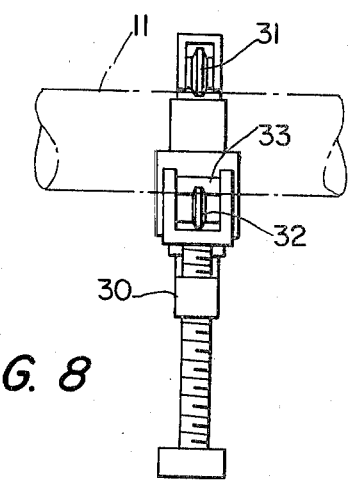
FIG. 8 is an enlarged view from the right hand side of FIG. 7.

FIG. 2 illustrates the end of fitting 10 associated with the end of pipe 11, both in their natural, ungrooved state. A groove is then formed into the pipe 11 at a predetermined distance X back from the end of this pipe. For this purpose one could conveniently use a pipe cutting tool as shown in FIGS. 7 and 8, modified to include wheels which are sufficiently wider than a cutting element to form a groove without cutting the pipe. As illustrated in FIGS. 1 and 8, the grooving tool 30 includes a plain support roller 33 and a pair of grooving rollers 31 and 32. In the example wherein a 3" copper tubing was grooved, these grooving wheels 31 and 32 were shaped to form a groove of approximately 1/16" width and to a depth of approximately 1/32". The result, as shown in FIG. 3, is a groove having the proper depth and wherein some of the material therein is pushed inwardly and hence visible on the interior of the pipe.

With this groove 20 thus formed, the pipe 11 is inserted into fitting 10 by a known distance Y. With the distances X and Y thus known, the operator can form the groove 21 into the exterior of pipe fitting 10 in such a manner that the groove 21 is aligned with the groove 20 and so that any material pushed inwardly by formation of groove 21, which can be referred to as a circumferential protrusion, would enter the exterior of groove 20. Engaging elements 20 and 21 then form a circumferentially continuous solder stop.

With the pipe ends thus arranged, a flux material would be placed on the pipes in the vicinity where the solder will be added. In a known manner, flux material faciliates adherance of the soldering material to the pipes. The operator would then heat the entire overlapped material. For a conventional silver composition soldering material, the overlapped area would be heated to a temperature of 1100° F., using for example an oxygen acetylene torch. Using a conventional soldering material (for example 56% silver) the temperature range which is proper for flow of the solder by the capillary action is quite narrow. It is an advantage of the present invention that this high temperature within a narrow temperature range can be applied uniformly over the entire overlapped area without any attempt to create a variance in the temperature along this axial distance. With the pipe ends properly heated, the soldering material is applied to the exposed end 22 of the overlap. The material may be applied in the conventional form such as a ⅛" wire held up to the opening around its circumference. In accordance with a main feature of the present invention, the solder which is designated at 23 in FIG. 6, will then flow up to the aligned grooves but not therebeyond. Of course in practice traces or insignificant amounts may move slightly beyond the aligned grooves, but for practical purposes the flow of solder is essentially limited at the grooves.

It cannot be stated with exact certainty at which point in the grooves the flow stops. However, this is not material since the main purpose is to create a block for the solder flow at a point which is located well upstream from the end of the overlap where it opens into the interior of the conduit. Most likely, however, the solder material will stop at the middle of the grooves since along this circumferential line the pushed in portion of the outer pipe groove presses against the bottom of the groove on the inner pipe by virtue of the force that was applied to form the outer pipe groove.

Although the one example described herein relates to grooving in a 3" copper piping, it will be understood that the present invention is applicable to any piping wherein the soldering material is used and piping of any size. For larger pipes the groove would be appropriately increased in width and depth with the limitation that the size of the groove cannot be made so big that in forming it, the operator would distort the pipe in a plane perpendicular to the pipe axis.

Also, the grooves could of course be formed in many ways other than by the roll grooving tool shown herein. As merely one example compression dies could be used. Moreover, the grooves could even be formed on at least the inner pipe during the manufacture thereof.

Although the invention has been described in considerable detail with respect to preferred embodiments, it will be understood that the invention is capable of numerous variations and modifications apparent to those skilled in the art, without departing from the spirit and scope of the invention.

I claim:

1. A joint for joining together overlapping pipe ends comprising:
    a first circumferential groove formed into the exterior of the inner pipe end,
    a second circumferential groove formed into the exterior of the outer pipe end, said outer pipe including a circumferential protrusion across from the second groove and formed as a result of the formation of said second groove,
    a first and second grooves and the said circumferential protrusion all being axially aligned with the protrusion extending at least partially into the first groove to tightly engage the first groove to form a circumferentially continuous solder stop,
    the shape of the protursion being dissimilar from the shape of the first circumferential groove,
    and including a solder composition in the space between the overlapped pipe ends from an exposed end of the overlap, up to the grooves, and substantially terminating at the said stop with no more than an insignificant amount of solder located beyond the grooves.

2. A joint according to claim 1, wherein the grooves are circular.

3. A joint according to claim 1, wherein each groove is formed into the exterior of its respective pipe, forcing some material thereof radially inwardly.

4. A joint according to claim 1, wherein the pipe material is metal and the solder is a silver composition.

5. A joint according to claim 4, wherein the pipe is copper.

6. A method for forming a pipe joint between two concentric overlapping pipe ends, comprising the steps of:
    forming a circumferential groove into the exterior of the smaller, interior pipe,
    inserting the smaller pipe into an open end of the larger pipe to a predetermined position,
    forming a circumferential groove into the exterior of the outer, larger pipe end so that the groove is aligned with the groove on the smaller, inner pipe, the confronting surfaces of the grooves tightly engaging one another to form a circumferentially continuous solder stop,
    heating the pipe ends, and while the pipe ends are thus heated,
    introducing a solder material into an exposed end of the overlapped pipe ends, such that the solder flows between the pipe ends to solder them together, and is substantially terminated, in the axial direction, at the said stop, such that no more than an insignificant amount of solder passes beyond the grooves.

7. The method according to claim 6, wherein the grooves are circular.

8. The method according to claim 7, wherein the grooves are formed in the exterior of each pipe end, forcing some material of each pipe end radially inwardly.

9. The method according to any one of claims 6, 7 or 8 wherein the pipes are metallic and the solder is a silver composition.

10. The method according to claim 9, including heating the pipes to a temperature of approximately 1100° F.

11. The method according to any one of claims 6, 7 or 8 wherein the step of forming the grooves includes using a pipe cutting tool having at least one grooving roller and a support roller.

12. The method according to any one of claims 6, 7 or 8 wherein each groove has a width in the axial direction of approximately 1/16".

* * * * *